United States Patent [19]
Hauser et al.

[11] Patent Number: 5,628,189
[45] Date of Patent: May 13, 1997

[54] CHARGE PUMP FOR AXLE DRIVING APPARATUS INCLUDING HYDROSTATIC TRANSMISSION

[75] Inventors: Ray Hauser, Decatur; Daryl Smothers, Sullivan; John Schreier, Ville Grove, all of Ill.

[73] Assignee: Hydro-Gear Limited Partnership, Sullivan, Ill.

[21] Appl. No.: 393,845

[22] Filed: Feb. 24, 1995

[51] Int. Cl.$^6$ .................................................. F16D 31/02
[52] U.S. Cl. ................................................ 60/454; 60/488
[58] Field of Search ........................... 60/488, 486, 455, 60/487, 454

[56] References Cited

U.S. PATENT DOCUMENTS

| | | |
|---|---|---|
| 2,777,286 | 1/1957 | Badalini ................................. 60/488 |
| 2,975,597 | 3/1961 | Arz . |
| 3,175,363 | 3/1965 | Molly . |
| 3,213,616 | 10/1965 | Reinke . |
| 3,279,172 | 10/1966 | Kudo et al. . |
| 3,360,933 | 1/1968 | Swanson . |
| 3,411,296 | 11/1968 | Peterson ................................. 60/488 |
| 3,486,335 | 12/1969 | Kern et al. ............................. 60/488 |
| 3,654,761 | 4/1972 | Eickmann ............................... 60/488 |
| 4,041,703 | 8/1977 | Knapp ................................. 60/486 X |
| 4,189,921 | 2/1980 | Knapp . |
| 4,274,257 | 6/1981 | Koch . |
| 4,348,864 | 9/1982 | Ichimura . |
| 4,366,671 | 1/1983 | Chichester . |
| 4,606,428 | 8/1986 | Giere . |
| 4,627,237 | 12/1986 | Hutson . |
| 4,691,802 | 9/1987 | Ishimori . |
| 4,856,264 | 8/1989 | Nishimura . |
| 4,864,823 | 9/1989 | Ikejiri et al. ........................... 60/488 |
| 4,905,472 | 3/1990 | Okada ............................... 60/487 X |
| 4,922,717 | 5/1990 | Furumoto et al. .................... 60/488 X |
| 4,967,555 | 11/1990 | Maki et al. ......................... 60/487 X |
| 4,986,073 | 1/1991 | Okada .................................. 60/454 |
| 5,031,403 | 7/1991 | Okada ............................... 60/487 X |
| 5,060,477 | 10/1991 | Hayashi et al. ......................... 60/488 |
| 5,218,886 | 6/1993 | Louis et al. ........................ 60/487 X |
| 5,311,740 | 5/1994 | Shiba et al. ........................ 60/488 X |
| 5,317,936 | 6/1994 | Shiba et al. ........................ 60/487 X |
| 5,339,631 | 8/1994 | Ohashi ............................. 60/488 X |
| 5,356,347 | 10/1994 | Komura . |

FOREIGN PATENT DOCUMENTS 1126363  9/1968  United Kingdom .

OTHER PUBLICATIONS

Eaton Hydraulics Division, Hydrostatic Transaxle Series, 850 parts info. 1990 Daikin oil hydraulic equipment, BDX Series hydrostatic transmission.

*Primary Examiner*—John E. Ryznic
*Attorney, Agent, or Firm*—Gary R. Jarosik; Thomas C. McDonough

[57] ABSTRACT

A hydrostatic drive apparatus for transferring power from a light duty vehicle engine to an output axle, including a charge pump for providing additional hydraulic fluid to a hydrostatic transmission in the apparatus, wherein the charge pump is mounted external to the housing of the drive apparatus.

17 Claims, 12 Drawing Sheets

FIG. 13

CHARGE PUMP FOR AXLE DRIVING APPARATUS INCLUDING HYDROSTATIC TRANSMISSION

BACKGROUND OF THE INVENTION

This invention relates to charge pumps used on hydrostatic transmissions ("HST") or integrated hydrostatic transmissions ("IHT") for use in light duty applications. An HST can either have its own housing and be attached to an axle driving apparatus, or can be incorporated within a housing that includes the components of the axle driving apparatus. A unit that contains an HST within the housing of an axle driving apparatus is often referred to as an integrated hydrostatic transaxle. The operation of such units is described in U.S. Pat. Nos. 5,201,692 and 5,314,387, the terms of which are incorporated by reference.

SUMMARY OF THE INVENTION

This invention presents a unique and novel manner of providing and mounting charge pumps for both IHTs and stand-alone HSTs that are mounted to a separate axle driving apparatus. As described in the '692 patent, an HST generally comprises a pump that receives and is rotated by an input shaft driven by the vehicle engine. The pump includes a plurality of pistons that contact a swashplate to cause axial movement thereof when the pump rotates. The pump is hydraulically connected to a motor, which is similar in construction to the pump. The motor receives hydraulic fluid from the pump, and movement of the motor pistons against a swashplate causes rotation of the motor, which is connected to and drives an output shaft. The hydraulic connection between the pump and motor is a closed circuit; however, in any such circuit there will be deliberate and incidental leakage due to lubrication requirements, the high pressure of the hydraulic fluid and manufacturing tolerances. Thus, the HST requires a mechanism to replace fluid leaked from the closed circuit. This replacement fluid is commonly called make-up fluid.

In present HST designs, the pump and motor are often mounted on a center section that includes the hydraulic circuit therein. The hydraulic circuit includes two sides: a high pressure side and a low pressure side. The low pressure side is sometimes referred to as the vacuum side. These two sides are reversed when the vehicle motion is changed from forward to reverse.

The center section is generally mounted in a housing, and the housing provides a hydraulic fluid sump. Make-up fluid is brought into the low pressure side of the hydraulic circuit from the sump. In the preferred embodiment, this is accomplished through check valves mounted directly into the center section. The check valves may also be in a separate plate that is in communication with the center section, as shown in the '692 patent. This system often does not provide sufficient fluid flow into the low pressure side of the circuit to replace the fluid leakage, and a charge pump may be used to assist in this process. This invention provides for an efficient manner of mounting a charge pump external to the HST housing but still in communication with the hydraulic circuit in the center section.

The external charge pump confers significant benefit with respect to accessibility on the hydraulic system. The external charge pump is accessible without disassembling the unit, thereby allowing addition, replacement or upgrade of the charge pump. Previous charge pump configurations were not accessible without disassembly of the HST or IHT.

In addition, the external charge pump allows for the potential to easily access pressurized hydraulic fluid. The external charge pump cover can be easily replaced by use of simple tools. The charge pump cover can then be upgraded to include simple hydraulic fittings, and pressurized hydraulic fluid can then be accessed and used for auxiliary functions. Internal charge pumps, in comparison, generally require a complex series of chambers, connections and fittings in order for fluid to be accessible exterior to the housing.

Additional benefits and features of this invention will be disclosed in the description of the drawings.

DETAILED DESCRIPTION OF THE EMBODIMENTS

A charge pump embodiment of the invention incorporated on an IHT will be described in accordance with the accompanying drawings. FIGS. 1 through 5 illustrate an IHT configured with a horizontally split housing with upper housing 21 and lower housing 22. The invention does not require any specific housing configuration, and all known configurations can be accommodated. All specifics of an IHT are not shown in these figures, as the general operation of an IHT is known in the art.

Figure 1:
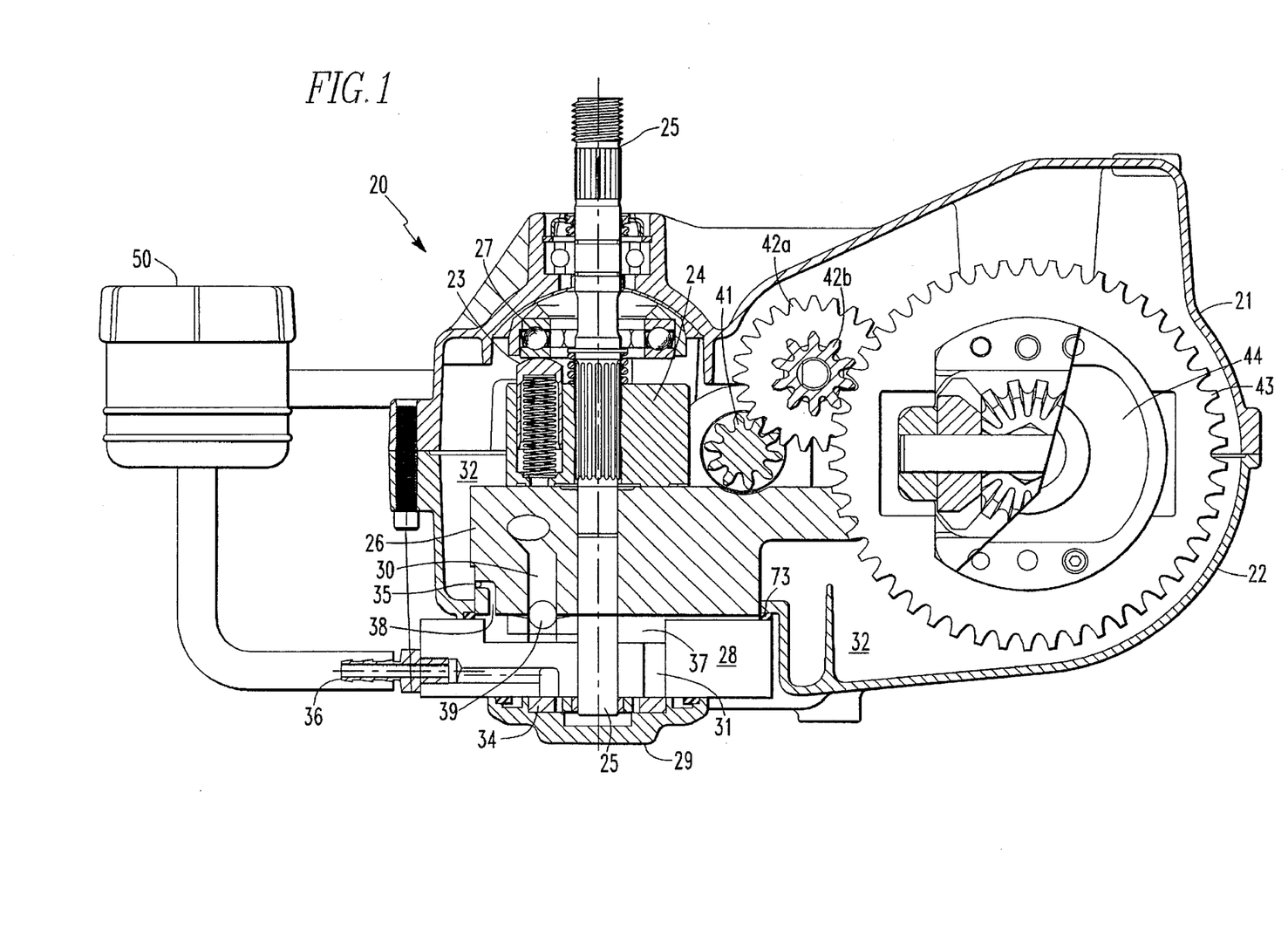
FIG. 1 is a sectional side view of a charge pump and IHT in accordance with the present invention.
Figure 2:
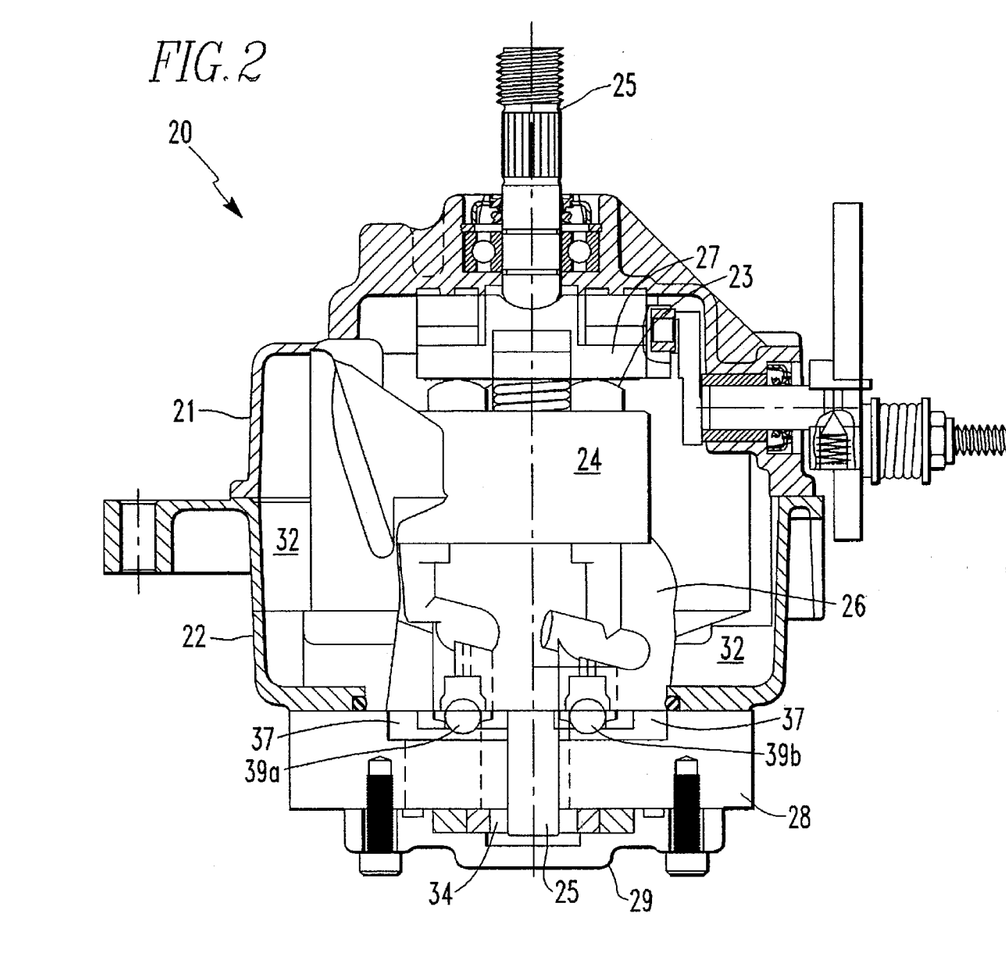
FIG. 2 is a sectional end view of the IHT shown in FIG. 1.
Figure 3:
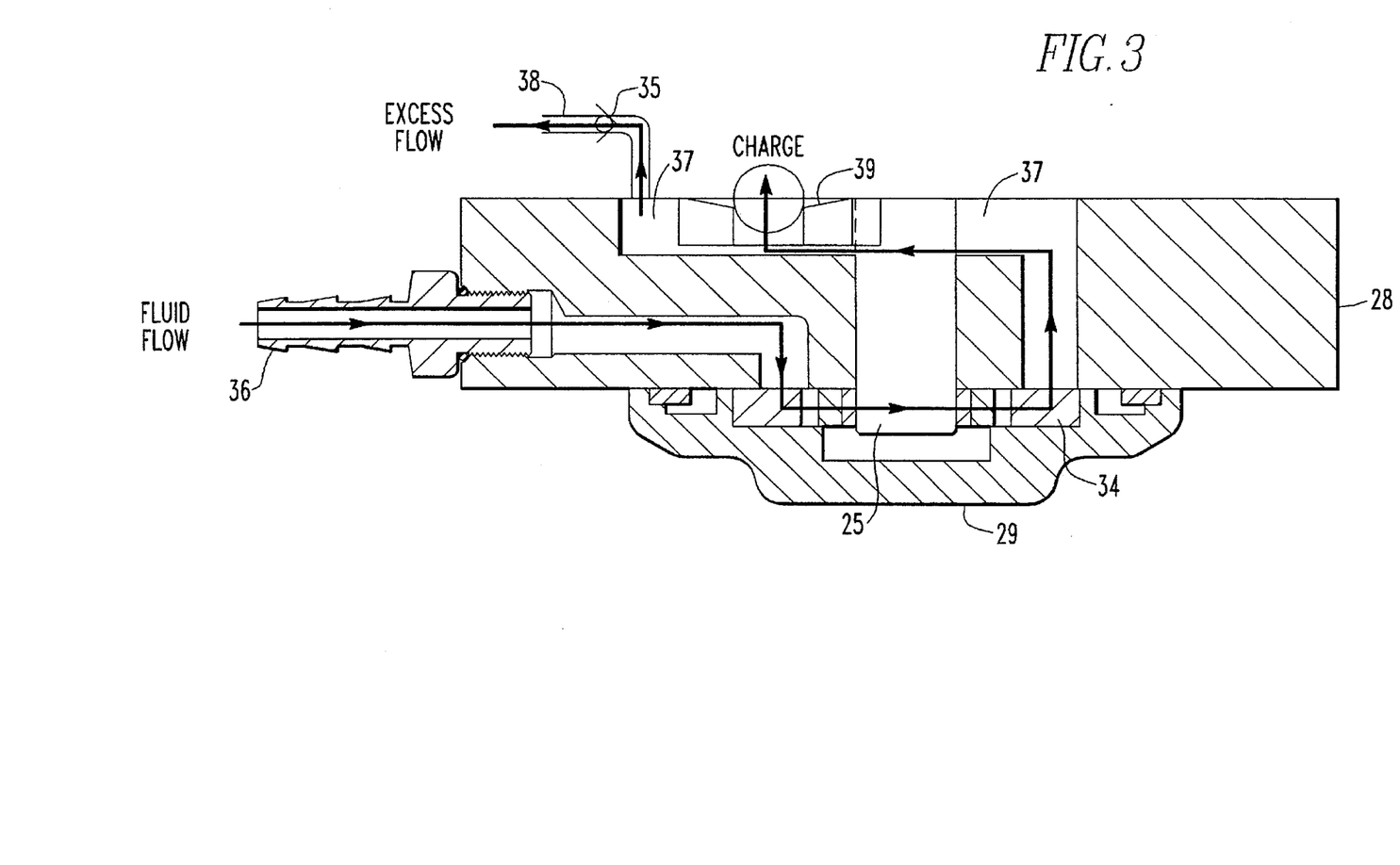
FIG. 3 is a sectional side view of the porting plate and charge pump of the IHT shown in FIG. 1, with a typical hydraulic fluid flow path shown.
Figure 4:
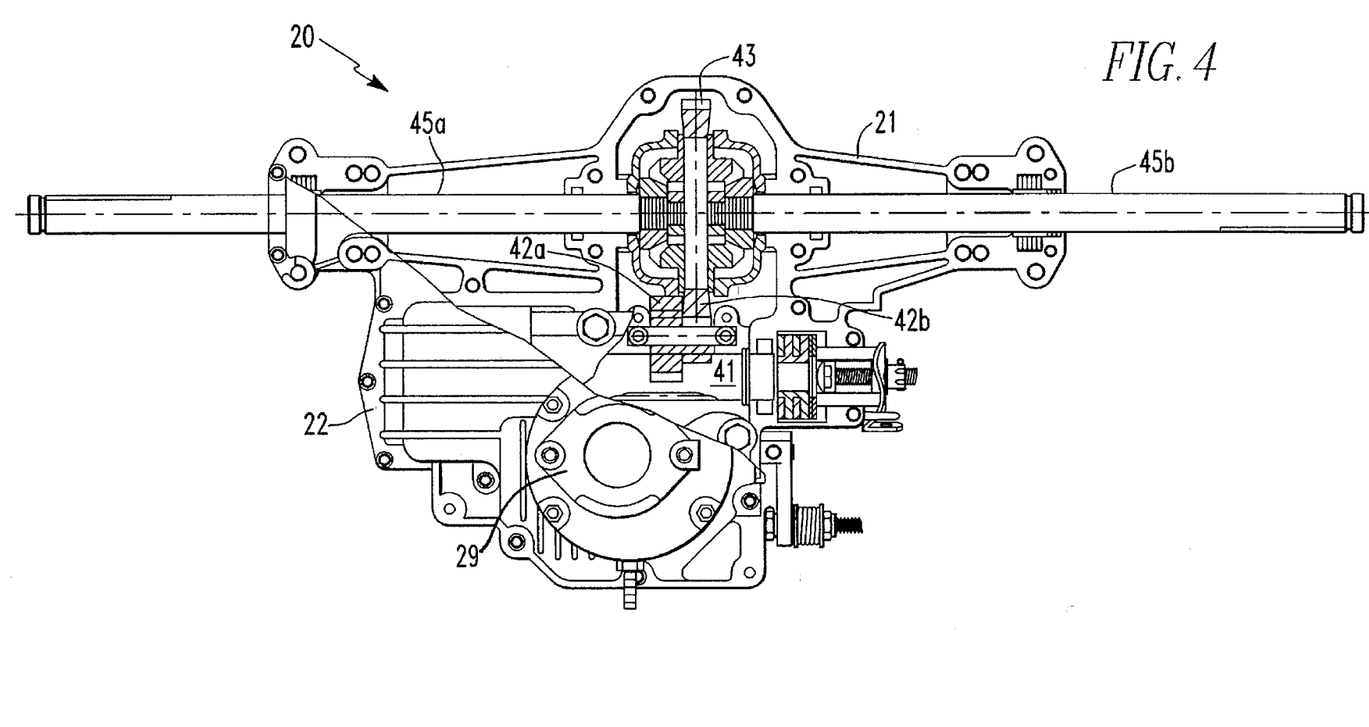
FIG. 4 is a partial sectional bottom plan view of the IHT shown in FIG. 1, with the lower housing and charge cover partially cut away.
Figure 5:
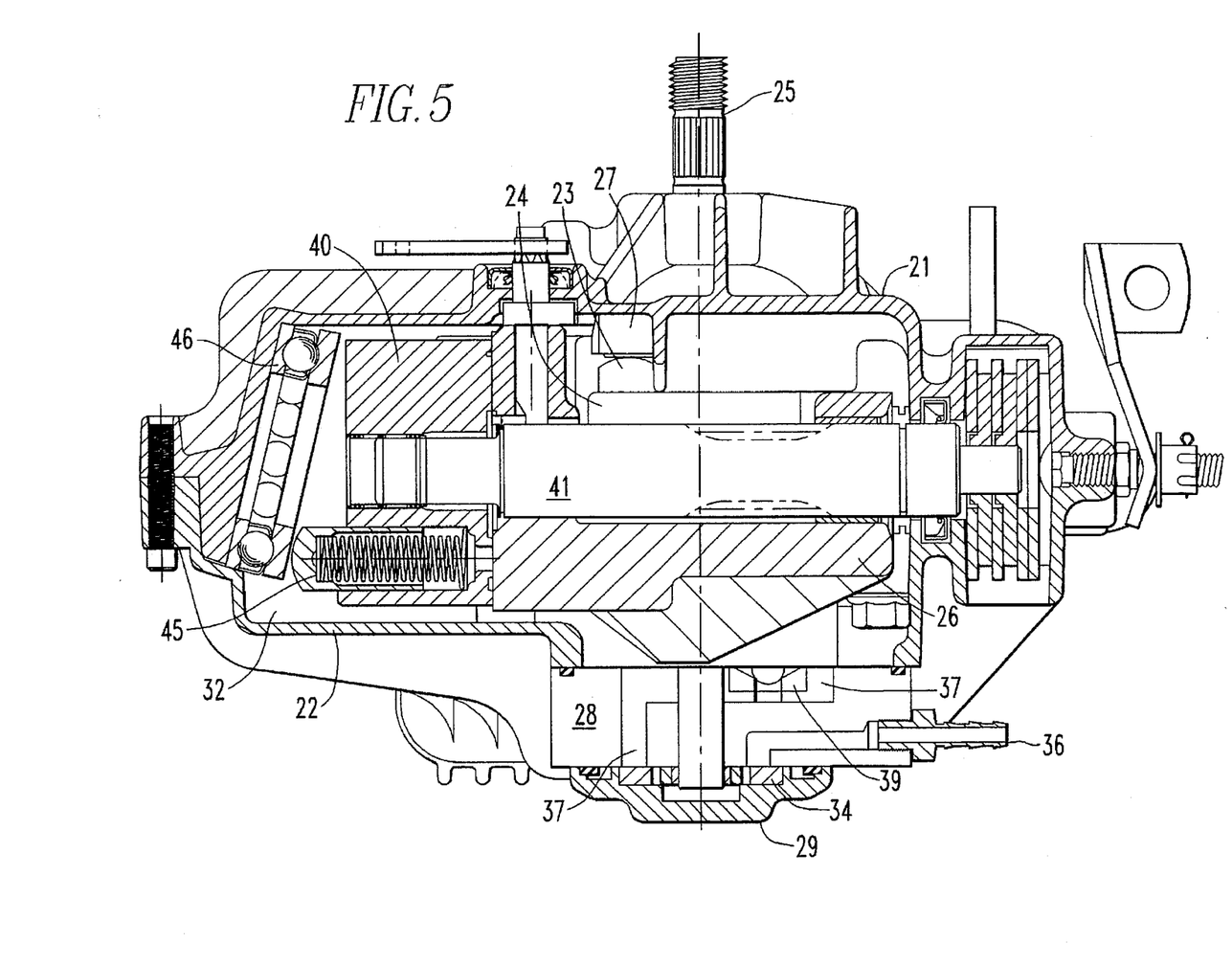
FIG. 5 is a sectional orthogonal side view of the IHT shown in FIG. 1.

Pump 24 is disposed on center section 26 and receives input shaft 25, which communicates with and is driven by a vehicle engine (not shown). Center section 26 includes internal porting 30 that hydraulically connects pump 24 and motor 40. Pump pistons 23 engage adjustable swashplate 27 to create pressure within center section internal porting 30. Housings 21 and 22 form a sump or reservoir 32 external to center section 26. Motor 40 is connected to and drives output shaft 41, which in turn drives gear 42a, which is connected to gear 42b, which then drives gear 43 and the remaining gears of differential 44. Differential 44 is in turn operatively connected to the output drive axles 45a and 45b of the vehicle. The specifics of the output gearing and differential are not essential to this invention and are disclosed in the '387 patent.

Figure 7:
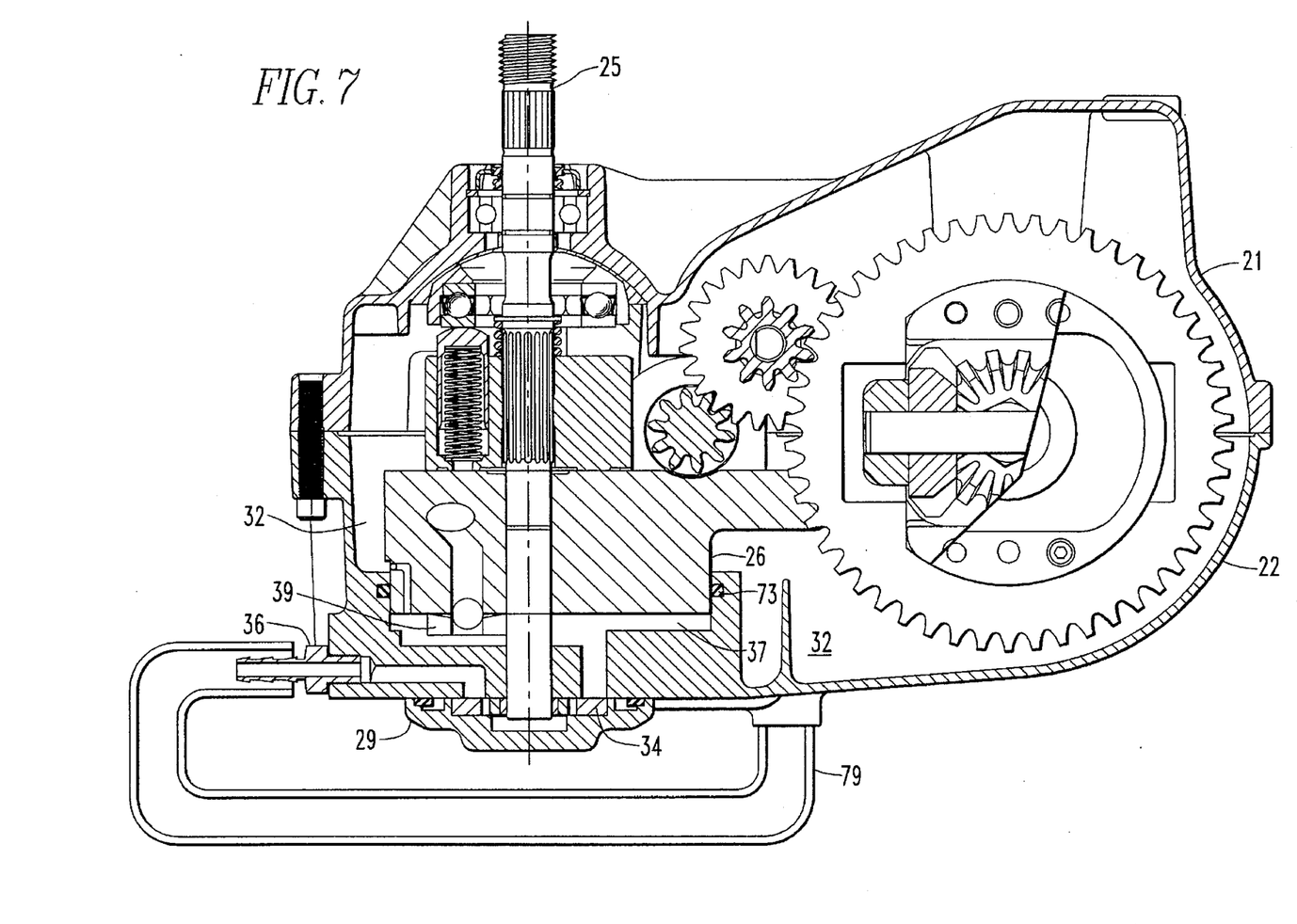
FIG. 7 is a sectional side view of another embodiment of an IHT in accordance with the present invention, with the porting plate incorporated as a part of the lower housing and a sump to sump transfer.

The charge pump includes an inlet porting plate 28 external to the lower housing 22 at the external surface thereof, i.e., attached to the lower housing 22. Porting plate 28 is mounted so that its interior surface is in close proximity to center section 26. Gerotor housing 29, which is also known as a charge cover, is attached to the external surface of inlet porting plate 28, and gerotor set 34 is held in position by charge cover 29 and input shaft 25. This embodiment also includes mounting the porting plate 28 on other housing elements, or parts that may be labeled by other nomenclatures, that would perform functions similar to the described upper and lower housings. Porting plate 28 includes an inlet 36 that is connected to an external reservoir 50 that contains hydraulic fluid and which is typically mounted on a supporting member of the vehicle on which the IHT is mounted. Reservoir 50 is in communication with and receives hydraulic fluid from sump 32. Inlet 36 could also be in communication with and receive fluid from sump 32 instead of reservoir 50, as shown in FIG. 7, where hose 79 is used to connect inlet 36 and sump 32. Inlet 36 could also be connected directly to sump 32.

Input shaft 25 extends through pump 24 and center section 26 to drive gerotor set 34, which is of a standard design known in the art. Rotation of gerotor set 34 by shaft 25 creates a low pressure or suction at inlet 36 that remains constant regardless of the forward or reverse status of the HST. The porting plate 28 also includes fluid passage 31 in communication with gerotor set 34. The action of the gerotor will cause fluid forced from the gerotor set into passage 31 to become pressurized. Thus, fluid is drawn through inlet 36 by the suction created by rotation of gerotor 34; the pressurized fluid is then forced into passage 31 and then into gallery 37. Gallery 37 is formed and defined by the interface between the inlet porting plate 28 and the center section 26. In the embodiment shown in FIG. 1, lower housing 22 includes an opening for the bottom surface of center section 26 to be approximately flush with the external bottom surface of lower housing 22. The attachment location of center section 26 in upper housing 21 establishes the position of the center section 26. Other embodiments with different split lines to the housing elements would have a similar opening. The position of the interface between the center section and the porting plate is not critical. In the embodiment shown in FIG. 1, the interface is flush with the external housing, but may move from that position in other embodiments.

Figure 6:
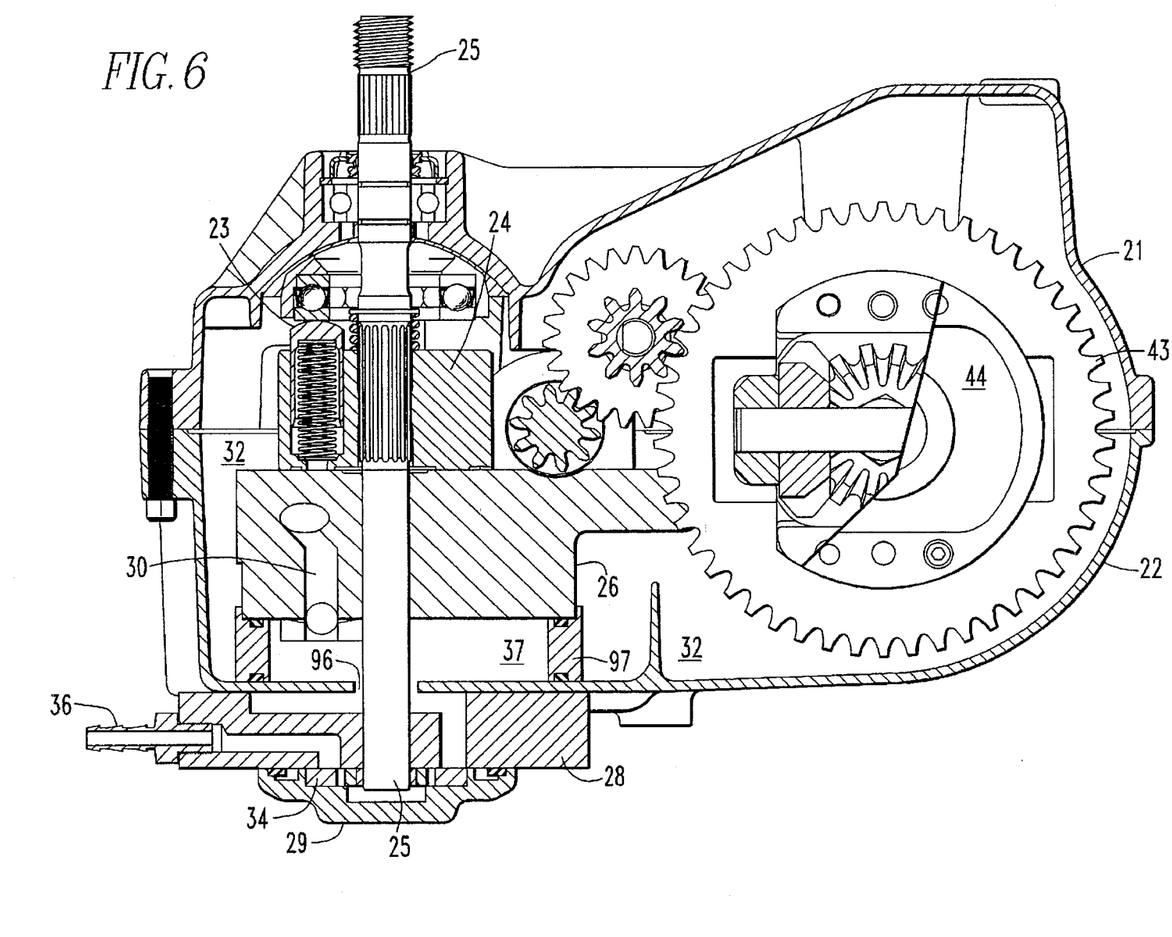
FIG. 6 is a sectional side view of another embodiment of an IHT in accordance with the present invention, with the center section enclosed in the housing and the porting plate mounted to the exterior of the housing.

In an alternative embodiment shown in FIG. 6, center section 26 could be mounted entirely within the IHT housing and inlet porting plate 28 would then be mounted on the external surface of lower housing 22. The charge pump is then connected to internal porting 30 of center section 26 with a lower housing passage 96 and a gallery 37 formed inside the lower housing by a gallery housing 97.

FIG. 7 shows another embodiment of this invention, wherein the porting plate 28 has been integrally formed with the lower housing 22. Center section 26 is in communication with an internal surface of lower housing 22. Gallery 37 for the hydraulic fluid is formed and defined by the lower surface of center section 26 and the internal surfaces of lower housing 22. An o-ring 73 is used to aid in positioning and seating these elements and prevents leakage of hydraulic fluid from gallery 37. The principal benefit of this embodiment is the reduction in complexity by the elimination of a separate porting plate. In the embodiment shown in FIG. 1, o-ring 73 seals gallery 37 from the interface between porting plate 28 and lower housing 22 as well as from sump 32. With the integration of porting plate 28 and lower housing 22 into a single piece, the requirement to seal between these two is eliminated, which thus increases the reliability of the IHT.

In the embodiment shown in FIGS. 1–5, check valves 39a and 39b are operatively connected to internal porting 30 of center section 26. As shown in this embodiment, check valves 39a and 39b may be included in plugs that are threaded directly into the surface of center section 26. Alternatively, they may be located in a separate plate that is then secured to center section 26.

The two check valves 39a and 39b each communicate with a different side of the internal hydraulic porting 30. As previously stated, the hydraulic circuit, including internal hydraulic porting 30, consists of a high pressure and a low pressure side, which are reversed when the vehicle direction of motion is changed. Thus, while the HST is in the forward position, one side of the hydraulic circuit is under high pressure and the corresponding check valve is closed. At the same time the other side of the hydraulic circuit is under low pressure and that corresponding check valve is open and receives hydraulic fluid from gallery 37. When the HST is moved to reverse, the two sides switch and the formerly low pressure side is under high pressure and the corresponding check valve is now closed and the high pressure side is now under low pressure, opening that corresponding check valve.

When the HST is in the neutral position, there is no demand for make-up fluid. However, since the rotational speed of input shaft 25 does not vary, the fluid pressure supplied to gallery 37 from gerotor set 34 will remain constant, requiring fluid to be diverted back to sump 32 through relief passage 38 formed into center section 26. Relief valve 35, which may be located at any point in passage 38, controls the flow through passage 38. While the relief passage was selected to be through the center section in this embodiment of the invention, alternative passages can be formed through the porting plate 28 or through the housing 22; the locations of the relief passage in other than center section 26 are considered obvious variations of the invention. Also, relief valve 35 can be a variety of devices in configurations that are known in the art, and would remain in communication with passage 38 regardless of the location of that passage.

A charge pump embodiment of the invention incorporated in an HST will now be described in accordance with the accompanying drawings. As discussed above, another embodiment of this invention uses the charge pump in a stand-alone HST that is mounted within a housing separate from that of the components that transfer power from the HST to one or more axle shafts. In such an embodiment, the specifics of the charge pump and related structures shown in FIG. 3 can remain the same. FIGS. 8–13 show such a stand alone HST unit incorporating a charge pump embodiment of the invention. The general operation of the HST is identical to that described above and elements that are structurally identical to those described above are given identical numerals.

Figure 9:
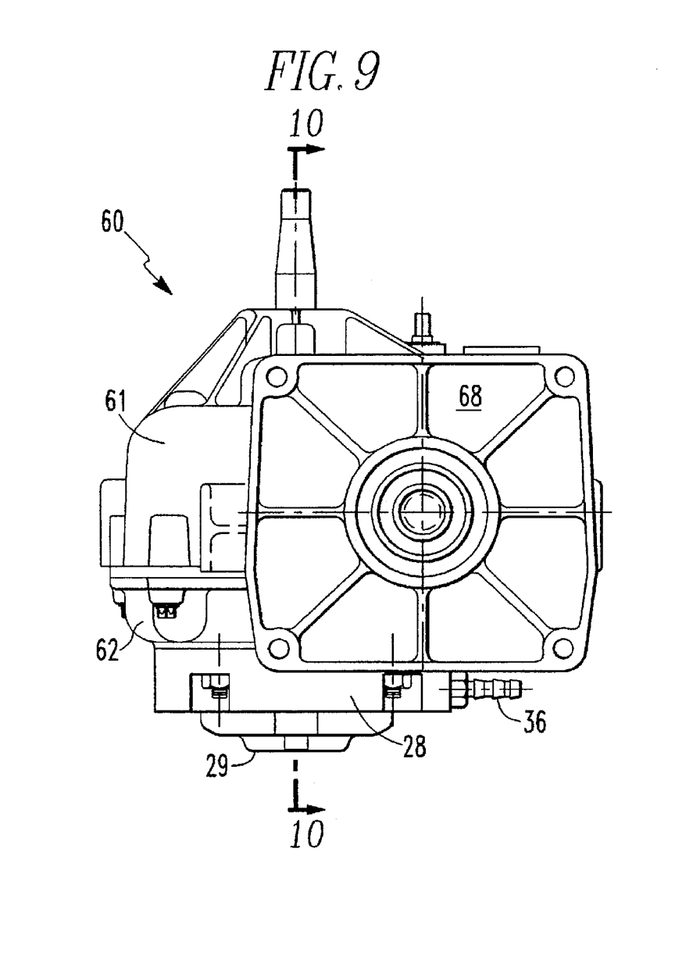
FIG. 9 is a further elevational end view of the HST shown in FIG. 8.
Figure 10:
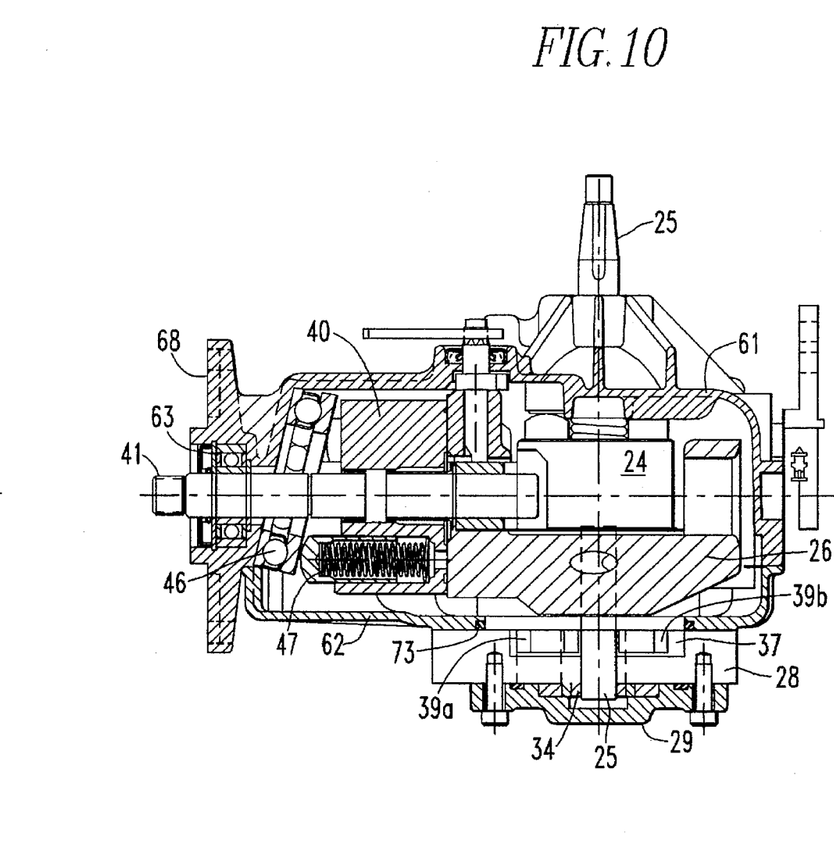
FIG. 10 is a sectional side view of the HST along the line 10—10 in FIG. 9.
Figure 11:
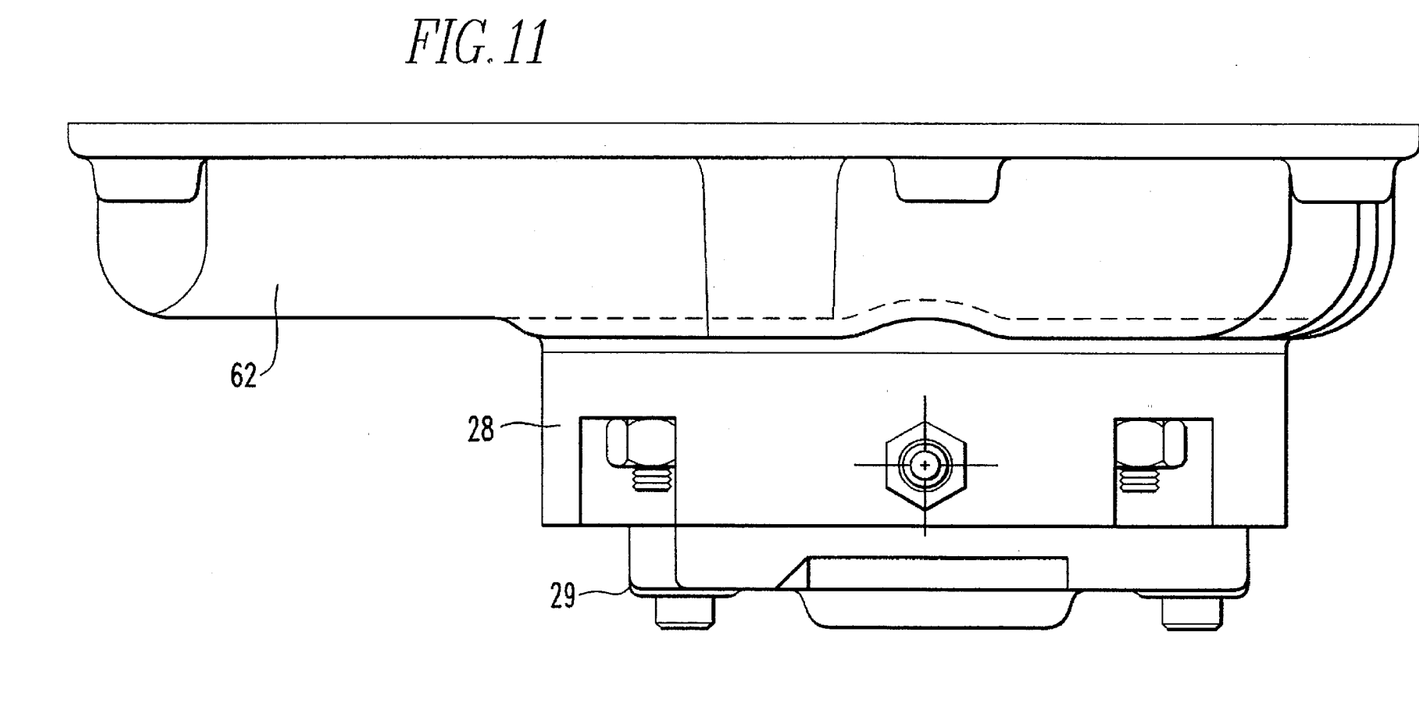
FIG. 11 is an elevational side view of the HST lower housing, porting plate and charge cover shown in FIG. 8.

As shown in FIGS. 9 and 10, HST 60 includes upper housing 61 and lower housing 62. In these figures, the rotation of motor 40 caused by action of the motor pistons 47 against fixed swashplate 46 drives output shaft 41. Output shaft 41 is supported by bearings 63, and extends through the transmission mounting plate 68 that is integrally formed with upper housing 61 so as to engage a separate axle driving apparatus (not shown).

Figure 8:
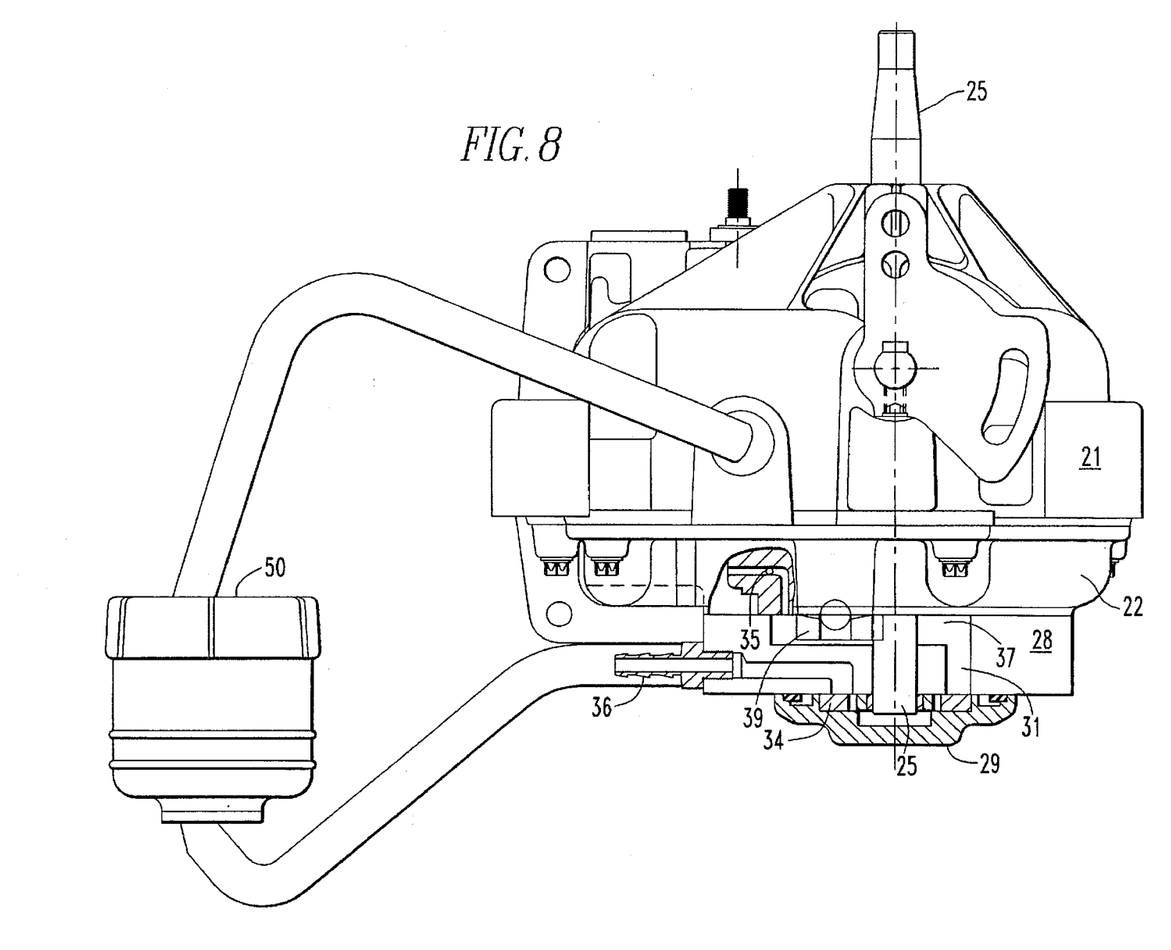
FIG. 8 is an elevational end view of an HST incorporating a charge pump in accordance with the present invention.

Inlet 36 can receive fluid from the housing of an axle driving apparatus to which the HST 60 is mounted. As shown in FIG. 8, fluid may also be received from a reservoir 50 that would be mounted to the support structure of the vehicle to which the HST and axle driving apparatus were attached. External reservoir 50 would then be in communication with and receive hydraulic fluid from sump 32. As in the IHT configuration, inlet 36 could also be in communication with sump 32 formed by the upper housing 61 and lower housing 62.

Figure 12:
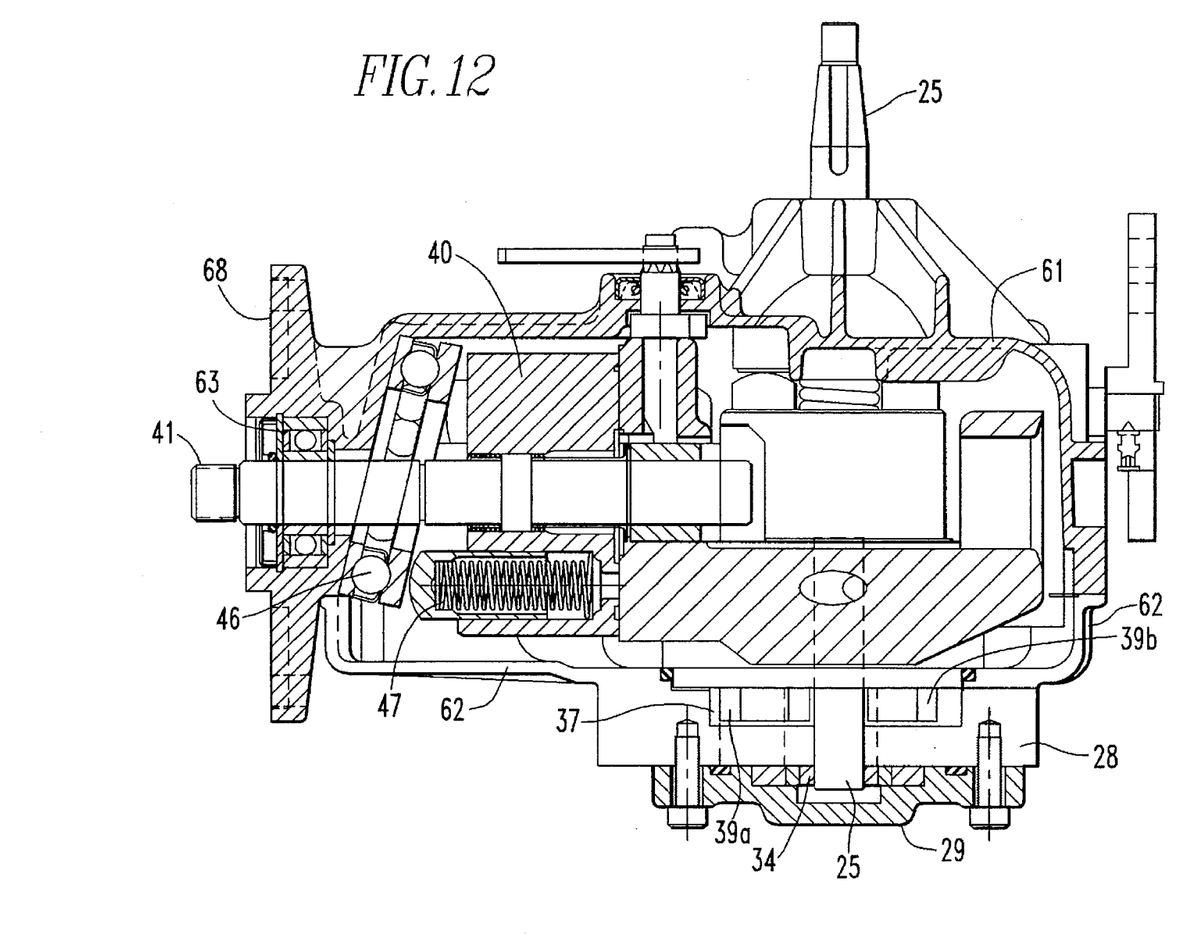
FIG. 12 is a sectional side view of another embodiment of an HST with a charge pump in accordance with the present invention incorporating the porting plate into the lower housing.
Figure 13:
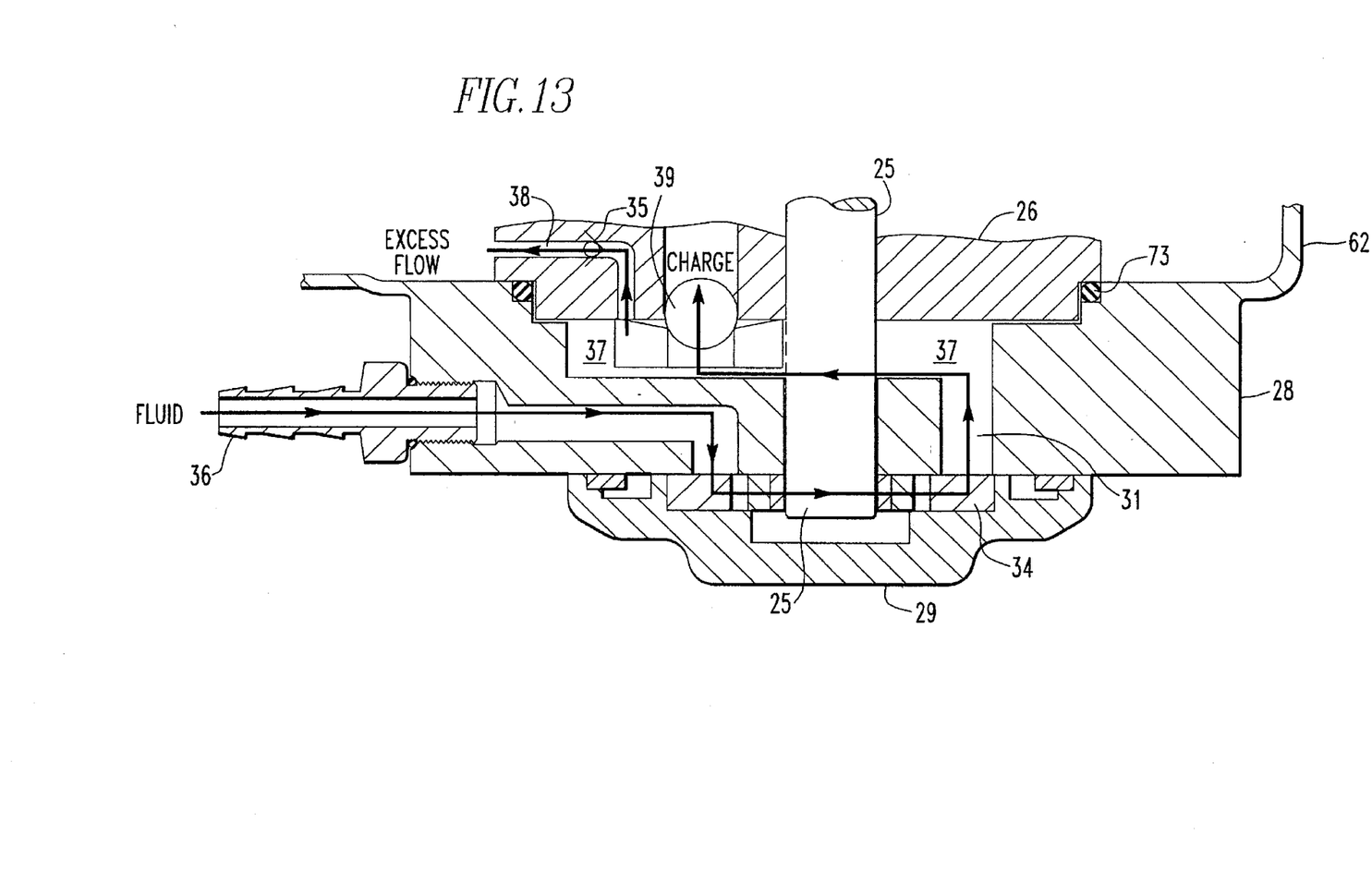
FIG. 13 is a sectional side view of the porting and charge pump detail of the embodiment shown in FIG. 12 with a typical hydraulic fluid flow path shown.

Another embodiment of the charge pump and lower housing is shown in FIGS. 12 and 13, wherein the inlet porting plate 28 is integrally formed with the lower housing 62, similar to the embodiment shown in FIG. 7. The explanation provided above for the IHT version of this embodiment is applicable for the HST. The same benefits that accrue to the IHT from this embodiment also accrue to the HST.

It is to be understood that the above description should not be read as limiting the scope of this invention, as further features and benefits will be obvious to one skilled in the art. This invention should be read as limited by the claims only.

We claim:

1. An apparatus for transmitting power from a vehicle engine to an output shaft, comprising:
    a housing;
    a hydrostatic transmission disposed substantially within said housing, said hydrostatic transmission comprising a center section having hydraulic porting formed therein; a pump mounted on said center section and drivingly linked to said vehicle engine; and a motor mounted on said center section and hydraulically connected through said hydraulic porting to said pump, said motor being drivingly connected to said output shaft;
    a sump containing hydraulic fluid in flow communication with said hydrostatic transmission for supplying hydraulic fluid thereto;
    a charge pump mounted on an external surface of said housing and spaced from said hydrostatic transmission for creating high pressure hydraulic fluid;
    a gallery, in hydraulic fluid flow communication with said charge pump and said hydraulic porting, formed in the space between said charge pump and said hydrostatic transmission for providing a storage location for a quantity of said high pressure hydraulic fluid;
    at least one check valve associated with said hydraulic porting for controlling the flow of said high pressure hydraulic fluid from said gallery to said hydraulic porting; and
    at least on relief valve associated with said gallery for diverting said high pressure hydraulic fluid from said gallery to said sump.

2. An apparatus for transmitting power from a vehicle engine to an output shaft, comprising:
    a housing;
    a hydrostatic transmission disposed substantially within said housing, said hydrostatic transmission comprising a center section having hydraulic porting formed therein; a pump mounted on said center section and drivingly linked to said vehicle engine; and a motor mounted on said center section and hydraulically connected through said hydraulic porting to said pump, said motor being drivingly connected to said output shaft;
    a sump containing hydraulic fluid in flow communication with said hydrostatic transmission for supplying hydraulic fluid thereto;
    a porting plate disposed substantially adjacent to the external surface of said housing having internal porting formed therein, said internal porting being in flow communication with said hydraulic porting;
    a charge cover mounted over said porting plate; and
    a charge pump in flow communication with said internal porting mounted between said porting plate and said charge cover.

3. An apparatus as set forth in claim 2, wherein said housing comprises an upper casing and a lower casing connected along a plane which is generally parallel to the plane of said motor output.

4. An apparatus as set forth in claim 2, wherein said sump is integrally formed in said housing.

5. An apparatus as set forth in claim 2, wherein said sump comprises a reservoir external to said housing.

6. An apparatus as set forth in claim 2, wherein said housing has an opening formed therein and said center section is mounted in said housing to be in communication with said opening.

7. An apparatus as set forth in claim 6, wherein a lower surface of said center section extends through said opening to be generally in the same plane as the external surface of said housing.

8. An apparatus as set forth in claim 2, further comprising at least one check valve associated with said hydraulic porting.

9. An apparatus as set forth in claim 8, wherein said at least one check valve is mounted in said center section.

10. An apparatus as set forth in claim 2, wherein said porting plate is mounted to the external surface of said housing.

11. An apparatus as set forth in claim 2, wherein said charge pump comprises a gerotor drivingly connected to said vehicle engine.

12. An apparatus as set forth in claim 2, wherein a gallery is formed between said center section and said porting plate, said gallery being in flow communication with said internal porting and said hydraulic porting.

13. An apparatus as set forth in claim 2, wherein said center section is substantially "L"-shaped.

14. An apparatus for transmitting power from a vehicle engine to an output shaft, comprising:
    a housing comprising an upper casing and a lower casing, said lower casing having casing porting formed therein;
    a hydrostatic transmission disposed substantially within said housing, said hydrostatic transmission comprising a center section having hydraulic porting formed therein; a pump mounted on said center section and drivingly linked to said vehicle engine; and a motor mounted on said center section and hydraulically connected through said hydraulic porting to said pump, said motor being drivingly connected to said output shaft;
    a sump containing hydraulic fluid in flow communication with said hydrostatic transmission for supplying hydraulic fluid thereto;

a charge cover secured to the lower casing and hydraulically connected to said hydrostatic transmission and said sump through said casing porting; and a gerotor mounted in said charge cover and drivingly connected to said vehicle engine.

15. An apparatus as set forth in claim 14, wherein said upper casing and said lower casing are connected along a plane which is generally parallel to the plane of said output shaft.

16. An apparatus as set forth in claim 14, further comprising a relief valve associated with said casing porting for diverting hydraulic fluid from said charge pump to said sump.

17. An apparatus as set forth in claim 14, wherein said center section is substantially "L"-shaped.

* * * * *